July 4, 1961  J. W. TATTER  2,991,117
AUTOMOBILE DOOR
Filed Oct. 16, 1956  3 Sheets-Sheet 1

INVENTOR.
JOHN W. TATTER
BY
Henke & Hardesty
ATTORNEYS

July 4, 1961 J. W. TATTER 2,991,117
AUTOMOBILE DOOR
Filed Oct. 16, 1956 3 Sheets-Sheet 2

INVENTOR.
JOHN W. TATTER
BY
ATTORNEYS

July 4, 1961   J. W. TATTER   2,991,117
AUTOMOBILE DOOR
Filed Oct. 16, 1956   3 Sheets-Sheet 3
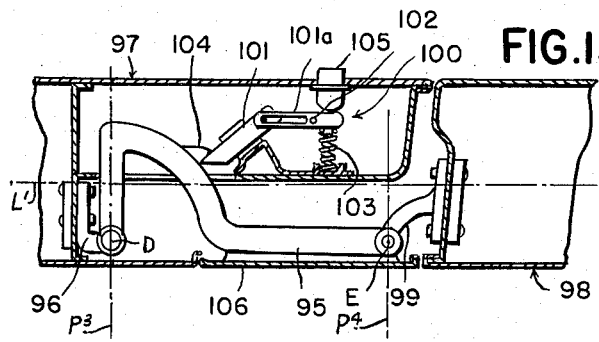
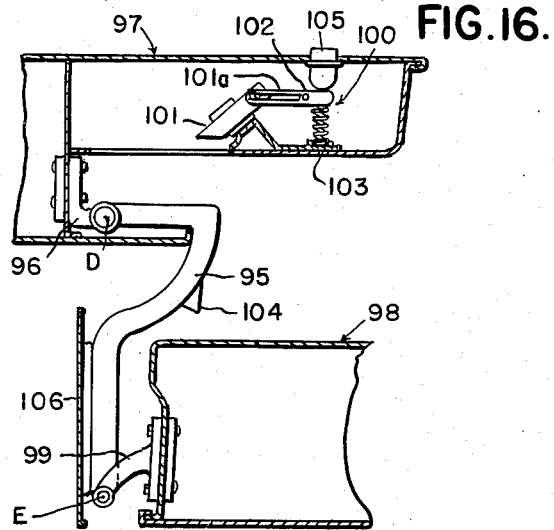
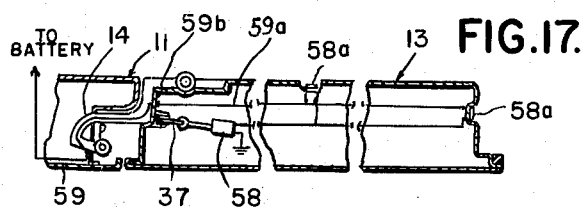
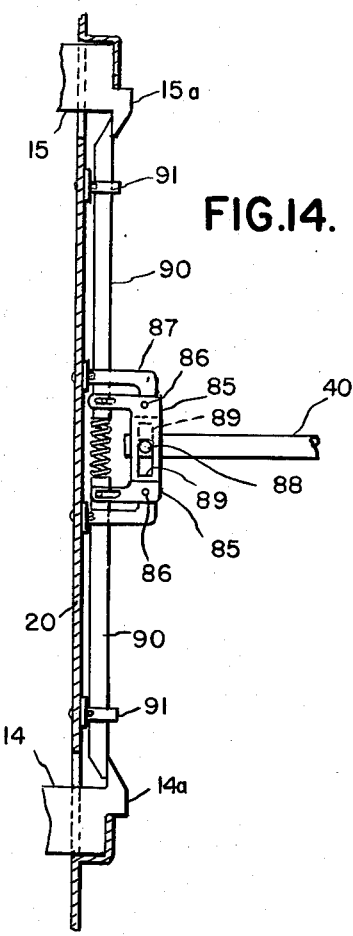
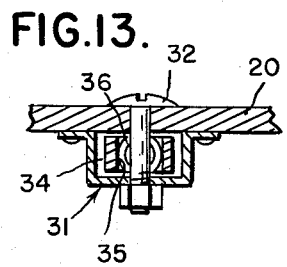
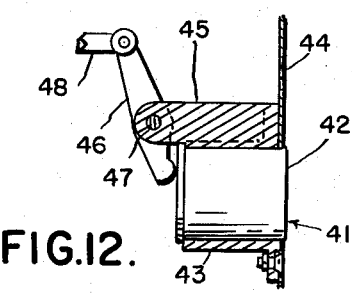
*INVENTOR.*
JOHN W. TATTER
BY
*Hauke & Hardesty*
ATTORNEYS

2,991,117
AUTOMOBILE DOOR
John W. Tatter, 462 Barr Court, Akron, Ohio
Filed Oct. 16, 1956, Ser. No. 616,198
12 Claims. (Cl. 296—44)

My invention relates to vehicle doors and more particularly to a door applicable for use in automobiles and which may be jackknifed with respect to the vehicle body to facilitate opening the door in a space restricted due to adjacent obstruction and to provide easier access to the rear seat of a two door automobile.

By "jackknifed" I mean that the automobile door is attached to the body of the vehicle by a hinge member, pivoted at its opposite ends to the body and door, respectively, to move in opposite angular directions whereby, when the door is first swung open a small distance in the normal manner about the pivot of the hinge attached to the body, the opposite end of the hinge may be released to permit the door to move so that the door may remain in a plane more or less parallel to the body of the vehicle and at the same time move forward with respect to the body. Such movement permits the automobile driver or passenger to enter or get out of the automobile without opening the door to a wide angle, thus facilitating such entry and alighting more conveniently when the automobile is parked in close quarters, that is, near a wall or adjacent automobile.

Designers of vehicles and particularly automobiles, are confronted with several problems when it comes to the design of the door. Obviously, a wider door could provide easier access to the interior, and especially to the rear seat of a two-door sedan type vehicle. However, wider doors require greater space adjacent the vehicle for opening due to the expanded arc through which the door must swing, and for practical purposes certain limits are reached in building present types of doors.

An object of the present invention is to improve vehicle design for providing a wider door adapted to be jackknifed forward relative to the vehicle body to permit easy access to the vehicle.

Another object of my invention is to facilitate entering and leaving an automotive vehicle under circumstances where the opening of the door is restricted due to close proximity of adjacent parked vehicles or construction, by providing a novel jackknifing door hinge permitting the door to be selectively jackknifed forward with respect to the vehicle body.

A further object of the invention is to provide an improved vehicle door by constructing a novel door hinge permitting operable use of the door in the normal standard fashion, but selectively unlocked and pivoted about a second hinge line to permit jackknifing of the door with respect to the vehicle body.

For a more complete understanding of the invention, reference may be had to the accompanying drawings illustrating a preferred embodiment of the invention, in which like characters refer to like parts throughout the several views, and in which FIG. 1 is a side elevational view of a preferred type of automotive vehicle utilizing my invention.

FIG. 12 is a cross-sectional detail view taken approximately on the line 12—12 of FIG. 11.

FIG. 13 is a cross-sectional detail taken substantially on the line 13—13 of FIG. 10.

FIG. 14 is a fragmentary cross-sectional view taken on the same line as FIG. 10 but illustrating a modified construction of the hinge locking mechanism.

FIG. 15 is a fragmentary view of a modified hinge construction with the door in closed position.

FIG. 16 is a view of the modified construction of FIG. 15 with the door in jackknifed position, and FIG. 17 is a view taken on substantially the same line as FIG. 11 but diagrammatically illustrating an electrically actuated hinge release mechanism.

Figure 1:
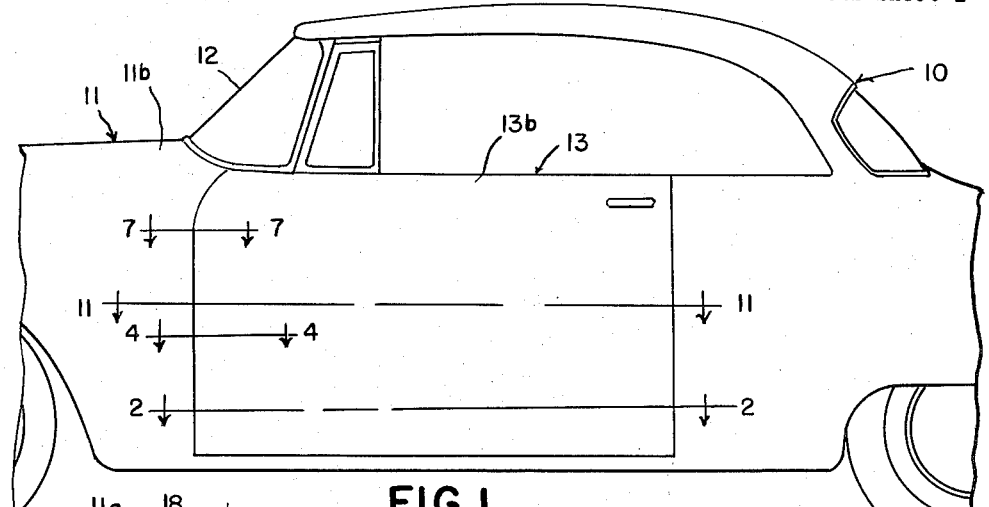

Referring to FIG. 1, a vehicle 10 preferably a two-door sedan type automobile and having a body structure 11 provided with a windshield 12, is illustrated as having an abnormally wide door structure 13 providing, when open, a maximum degree of access to the interior.

Figure 2:
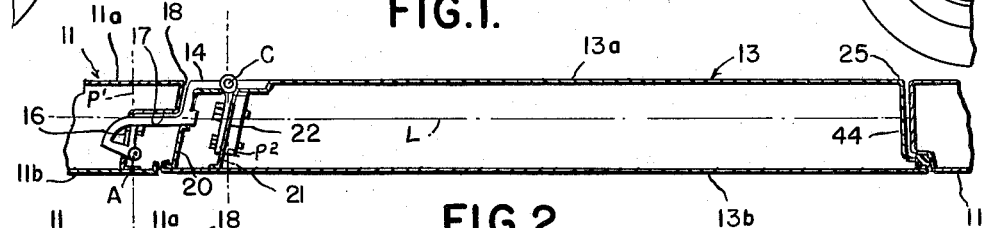
FIG. 2 is a cross-sectional view of the closed door, taken substantially on the line 2—2 of FIG. 1 showing a preferred door hinge constructed in accordance with the invention.
Figure 3:
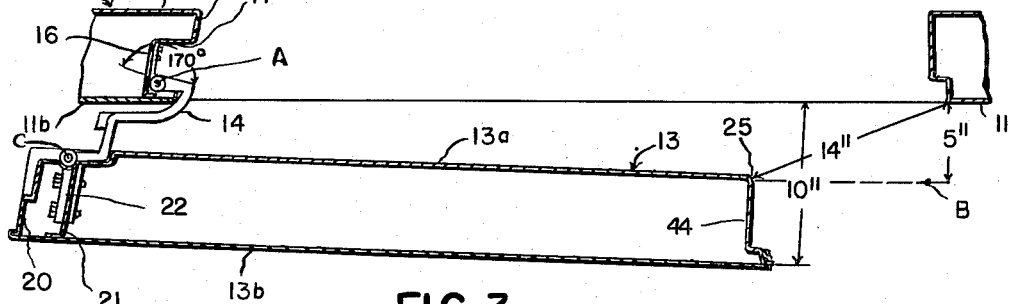
FIG. 3 is a cross-sectional view of the door of FIG. 2 in its jackknifed position.
Figure 7:
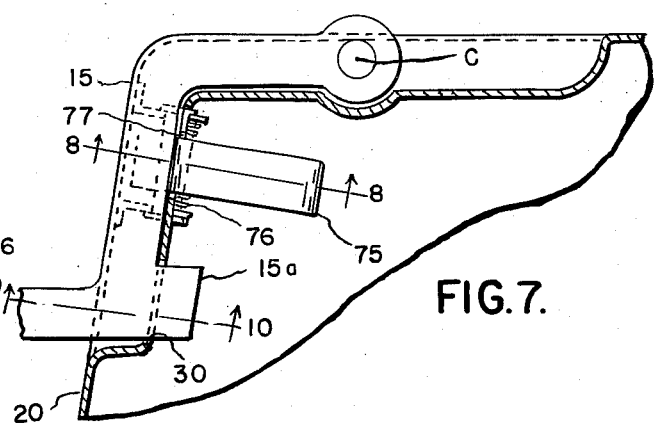
FIG. 7 is a fragmentary cross-sectional view of the door taken substantially on the line 7—7 of FIG. 1, and showing the inner hinge locked to the door.

Hinge members 14 and 15 are provided respectively in a lower and upper position on the door structure 13, FIGS. 2 and 3 illustrating the lower hinge member 14 and FIG. 7 illustrating the upper hinge member 15. The hinge members 14 and 15 are the same in all respects, and as shown in FIGS. 2 and 3, are hingedly connected at one end to a body hinge plate 16 mounted in a recess 17 provided in a body bulkhead 18 between inner and outer body panels 11a and 11b respectively. This is the standard hinging point of ordinary automotive vehicles.

The door structure 13 comprises inner and outer panels 13a and 13b respectively, separated at the forward end by a door bulkhead 20. An inner bulkhead 21 is also provided on which is mounted an inner hinge plate 22. The other end of the hinge member 14 is hingedly connected to this inner hinge plate 22 as illustrated. During normal door operation, the hinge members 14 and 15 are locked to the door structure 13, as will be explained, and the door will pivot, when opened, about the body hinged end of the hinge members 14 and 15, the pivot or hinge axis being designated by the letter A in the drawings.

Assuming an obstruction or another parked vehicle to be positioned as close as about 10 inches from the vehicle 10, it will be seen that the inner rear corner 25 of the door structure 13 will only come to the point B shown in FIG. 3, giving only about 5 inches of open space through which it would be extremely difficult, if not impossible, for a person to pass. The hinge members 14 and 15 are therefore so constructed and arranged that they may be released from the door structure 13, permitting the door to swing about a secondary pivot or hinge axis C, the hinge member being permitted at such time to swing about axis A in an arc of approximately 170 degrees to jackknife the door structure 13 forward relative to the body structure 11. Thus a space of about 14 inches, or almost three times the normal 5 inch space, is provided for access to the vehicle interior. Now, assuming there is no interference, the door in pivoting about the axis C to a further open position, a greater degree of access will be available than with standard hinged doors, providing greater accessibility than has hitherto been available.

Figure 10:
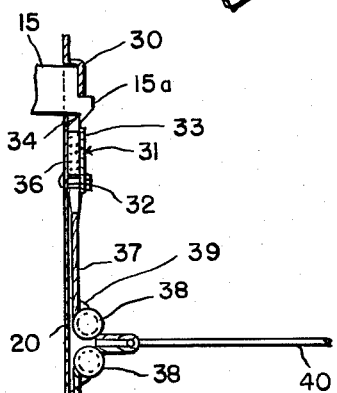
FIG. 10 is a fragmentary cross-sectional view taken substantially on the line 10—10 of FIG. 7 and showing the inner hinge locks engaged.

FIGS. 10 through 13 illustrate one preferred method of locking the hinge members 14 and 15 to the door structure 13. The hinges 14 and 15 are respectively provided with latch flanges or keepers 14a and 15a which, when the door structure and hinges are in the position shown in FIG. 11, protrude through slots 30. Spring loaded latch assemblies 31 are secured to the inner face of the bulkhead by any means such as the bolts 32 and as shown in FIG. 13, each preferably comprises a guide channel 33, a latch bolt 34 having a slot 35 through which the bolt 32 extends and in which a spring 36 is positioned to hold the latch bolt 34 in its extended or latched position, as shown in FIG. 10. A cable 37 is attached between the latch bolts 34 and is rigged through pulleys or sleeves 38 preferably mounted to the bulkhead 20 by any means such as a bracket 39. An actuating rod 40 is connected to the center of the cable 37 and extends the width of the door to an actuator assembly 41.

The actuator assembly 41 preferably comprises a manually operated button 42 slidably mounted in a guide member 43 on the inside of a rear bulkhead 44. The guide member 43 includes a bracket 45 and a link assembly 46 is pivotally connected thereto by any means such as a pin 47. As shown in FIG. 12, one end of the link bears on the inner side of the button 42 and the other end is connected to a fitting 48 adjustably connected to the end of the rod 40, so that manual pressure on the button 42, which is exposed only when the door is open, will pull on the rod, releasing the latch bolts 34 connected thereto by the cable 37.

A second actuator assembly 50 is provided on the inner panel 13a of the door, comprising a button 51 and shaft 52 slidably mounted in a guide 53 which is secured by any means to the inner face of the panel 13a. A link 54 having an arm 54a and a lug 54b is pivotally mounted by means of a pin 55 to a bracket 56 which is part of the guide 53. The arm 54a bears against a second fitting 57 mounted on the rod 40, and the lug 54b bears on the inner end of the shaft 52, so that manual pressure on the button 51 actuates the rod 40 to unlock the hinges as previously explained.

FIG. 17 illustrates diagrammatically a preferred method of actuating the hinge release mechanism electrically. A conventional solenoid 58 is operably connected to the cable 37 (or to the bellcranks 85 in the modified construction of FIG. 14), and is connected to parallel wired conventional push button switches 58a mounted in the door structure 13. A lead wire 59 from the battery is routed to the hinge member 14 substantially as shown and makes contact with the switch lead wire 59a through any suitable jack, plug, or contact plate 59b preferably at the point shown, where the hinge member 14 contacts the door structure 13.

Operation of either switch 58a will actuate the solenoid 58 to unlock the hinge members 14 and 15 as previously described. When the hinge member 14 breaks contact with the door structure 13, the electrical contact between lead wires 59 and 59a is broken, deenergizing solenoid 58 to permit the hinge release mechanism to return to its locked position.

Figure 6:
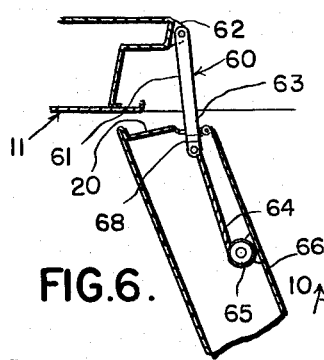
FIG. 6 is a fragmentary cross-sectional view of the door showing the door-stop mechanism of FIG. 4 when the door is in the normal opened position.

A door stop or brake mechanism 60 is provided to stop the door structure 13 at the position shown in FIG. 6 during normal door opening; that is, when the hinge member 14 is locked to the door structure 13, with hinge motion confined to movement around hinge axis A only. The brake mechanism 60 comprises a stop arm 61 pivotally connected at one end to the body structure by means of a bracket 62. The arm 61 is adapted to slide in a slot 63 provided in the bulkhead 20 of the door structure 13, and the other end is connected to a guide cable 64 which is wound on a spring loaded reel 65 mounted within the door structure 13 by any means such as a bracket 66.

Figure 8:
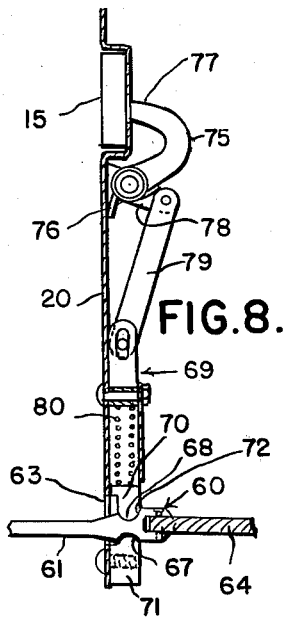
FIG. 8 is a fragmentary cross-sectional view taken substantially on the line 8—8 of FIG. 7 and showing the door stop mechanism latch engaged when the inner hinge is in the locked position of FIG. 7.
Figure 11:
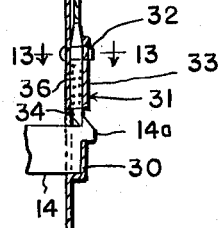
FIG. 11 is a cross-sectional view of the door taken substantially on the line 11—11 of FIG. 1 and showing the inner hinge lock release mechanism.

The end of the arm 61 connected to the cable 64 is provided with a bottom groove 67 and a top groove 68. A door stop locking mechanism 69, as shown in FIG. 8, comprising a spring loaded retractible locking pin 70 and a locking lug 71 respectively coacting with the grooves 68 and 67, prevent the arm 61 from being pulled out through the slot 63, due to a high inner shoulder 72 of the groove 68. This limits normal door opening to the position of FIG. 6.

Figure 9:
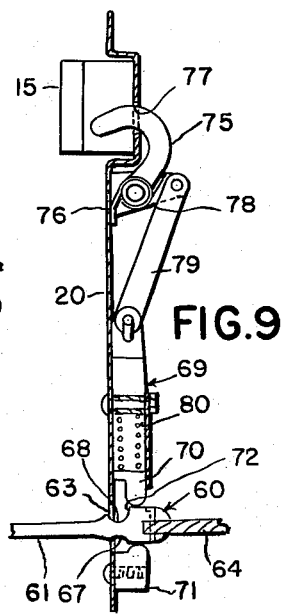
FIG. 9 is a view similar to FIG. 8 but with the door stop mechanism latch disengaged when the inner hinge of FIG. 7 is unlocked.

However, when the hinge member 15 is unlocked and moves away from the bulkhead 20 preparatory to jackknifing, a bellcrank 75 is urged by a spring 76 through a slot 77 in the bulkhead 20 under the hinge member 15, at shown in FIG. 9. An arm 78 on the bellcrank 75 is then raised, lifting a link 79 connected to the upper end of the locking pin 70, pulling the pin 70 out of engagement with the doorstop 68 compressing a spring 80, which is weaker than the spring 76. The door stop arm 61 may then extend outward, and as the door structure 13 jackknifes forward to the position of FIG. 5, the cable 64 is pulled through the slot 63, unwinding from the reel 65.

Figures 4, 5:
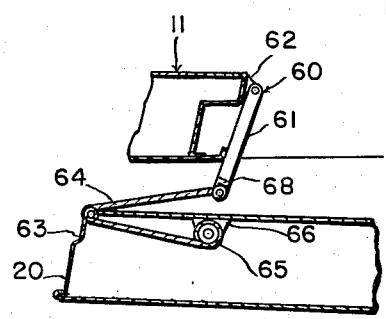
FIG. 4 is a fragmentary cross-sectional view of the closed door, showing a preferred door stop mechanism and taken substantially on the line 4—4 of FIG. 1.
FIG. 5 is a fragmentary cross-sectional view of the door showing the door-stop mechanism of FIG. 4 when the door is in the jackknifed position of FIG. 3.

When the door is closed thereafter, the cable 64, winding on the reel 65, guides the stop arm 61 into the slot 63. When the hinge member 15 is locked to the door structure 13, the bellcrank 75 is forced inward as shown in FIG. 8, lowering the lock pin 70 in place so that it will snap into the groove 68. When the door is closed completely, as shown in FIG. 4, the stop arm extends into the door fully, being permitted to ride between the pin 70 and the lug 71.

In FIG. 14, a modified construction of the hinge locking mechanism is shown, wherein the actuating rod 40 is connected to a pair of bellcranks 85 pivotally mounted by pins 86 to a bracket 87 secured to the inner side of the bulkhead 20. A pin 88 is secured to the rod and slidably engages in slots 89 in the bellcranks 85. The other ends of the bellcranks 85 are pivotally connected to the inner ends of a pair of latch bolts 90 which are slidably mounted in the bracket 87 and brackets 91 for engagement with the latch flanges 14a and 15a of the hinge members 14 and 15. Actuation of the rod 40 as previously described will, in this case, rotate the bellcranks 85, drawing the latch bolts 90 together, unlocking the hinges 14 and 15. A spring 92 is preferably positioned between the latch bolts 90 to urge them apart on release of the rod 40.

FIGS. 15 and 16 illustrate a modified structure in which a hinge member 95 is hingedly connected at one end as at hinge axis D to a hinge plate 96 mounted in a modified body structure 97. A modified door structure 98 is provided with a standard type of door structure 99 hingedly connected to the other end of the hinge member 95 as at hinge axis E.

A locking mechanism 100 is provided for locking the hinge member 95 to the body structure 97 and preferably comprises a latch 101 and a link 101a pivotally mounted as at 102, the latch 101 urged by a spring 103 into locking engagement with a latch flange or keeper 104 on the hinge member 95. A button 105 may be manually actuated to release the latch 101. The door structure 98 will normally open about the hinge axis E, but when the latch 101 is disengaged from the hinge member 95, the hinge member 95 will pivot about hinge axis D, permitting the door structure 98 to jackknife forward relative to the body structure 97, as shown in FIG. 16.

Due to the different operating requirements of this construction, a small body panel section 106 is mounted on the hinge member 95 and provides for an opening in the body structure 97 through which the hinge member 95 may project, being moved outward as shown with the hinge member 95.

It will be noted that when the door 13 is closed, as shown in FIG. 2, the axes A and C of the respective pivot pins are located respectively in spaced planes indicated by the dot-dash lines $P^1$ and $P^2$ extending transversely with respect to the plane of the door 13 indicated by the dot-dash line L.

Similarly, as shown in the modification of FIG. 15, when the door 98 is closed, the axes D and E of the respective pivot pins are located respectively in spaced planes $P^3$ and $P^4$ extending transversely with respect to the plane L' of the door 98.

Although I have only described and illustrated a few preferred embodiments of my invention, it will be apparent to one skilled in the art to which the invention pertains that various changes and modifications may be made therein, and the invention may be readily adapted to other types of vehicles, without departing from the spirit of the invention or the scope of the appended claims.

I claim:

1. In a vehicle, a body structure having a door opening, a one-piece integral door structure dimensioned to substantially close said opening, and a hinge for pivotally connecting said door and body structures, said hinge comprising a hinge member and separate pivot means hinging said member to each of said structures, said pivot means having axes which, when said door is closed, are located respectively in spaced planes extending transversely with respect to the plane of said door, a locking means securing said hinge member to only one of said structures against hinging movement with respect thereto, and means selectively operable for releasing said locking means when said door is in any position to provide for simultaneous free pivotal movement of both of said pivot means whereby to enable the door structure to jackknife relative to said body structure.

2. The vehicle as defined in claim 1 and in which said hinge member has a keeper portion, said locking means comprising a latch member carried by one of said structures and means resiliently urging said latch member into engaging contact with said hinge keeper portion to immobilize the pivot means hinging said hinge member to the last mentioned structure.

3. The vehicle as defined in claim 1 and in which said locking means comprises means carried only by one of said structures and selectively engaging with said hinge member to immobilize the pivot means hinging said hinge member to said last mentioned structure.

4. The vehicle as defined in claim 1 and in which said locking means is carried by said door structure and is operable to immobilize the pivot means hinging said hinge member to said door structure.

5. The vehicle as defined in claim 1 and in which said locking means is carried by said body structure and is operable to immobilize the pivot means hinging said hinge member to said body structure.

6. The vehicle as described in claim 1 and in which said structures and said hinge are cooperatively constructed and arranged to enable said door structure when said locking means is released to swing laterally outward and longitudinally forward with respect to said vehicle door opening while said door structure remains substantially parallel with the plane of said door opening.

7. The vehicle as defined in claim 2 and in which said releasing means comprises an actuator carried by the last mentioned structure and selectively operable to disengage said latch member from said keeper.

8. The vehicle as defined in claim 7 and in which said last mentioned structure comprises an inner panel, an outer panel, and bulkhead members separating said panels and substantially enclosing a compartment intermediate said panels, said locking and said releasing means being substantially disposed within said compartment.

9. In a vehicle, a body structure having a door opening, a one-piece integral door structure dimensioned to substantially close said opening, and a hinge for pivotally connecting said door and body structures, said hinge comprising a hinge member and separate pivot means hinging said member to each of said structures, a locking means securing said hinge member to only one of said structures against hinging movement with respect thereto, and means selectively operable for releasing said locking means when said door is in any position to provide for simultaneous free pivotal movement of both of said pivot means whereby to enable the door structure to jackknife relative to said body structure, a brake means cooperating with said body structure and said door structure and being operable only when said hinge member is locked to limit normal door movement to a predetermined arc, and means disengaging said brake means only when said locking means is released.

10. The vehicle as defined in claim 9 and in which said brake means comprises an arm member pivotally connected at one end to one of said structures and extending to the other of said structures, means carried by said other structures and engaging the other end of said arm member when said door structure is open, said disengaging means being operable to release said arm from said other structure thereby permitting said arm to withdraw from said other structure on jackknifing of said door.

11. The vehicle as defined in claim 10 and having means connecting said other end of said arm with said other structure at all times and operable to guide said arm into said other structure on closing of said door structure.

12. The vehicle as defined in claim 11, and in which said last mentioned means comprises a retracting mechanism carried by said other structure and having a cable connected to said arm member, said mechanism having means resiliently urging said cable to retract and to pull said arm member into said other structure and into engagement with the engaging means of said brake means.

References Cited in the file of this patent

UNITED STATES PATENTS

| | | |
|---|---|---|
| 563,680 | Nott | July 7, 1896 |
| 2,142,558 | Dumelin | Jan. 3, 1939 |
| 2,166,534 | Rosenfeld | July 18, 1939 |
| 2,494,682 | Aspin | Jan. 17, 1950 |
| 2,621,359 | Schuyler | Dec. 16, 1952 |
| 2,624,909 | Kujawa | Jan. 13, 1953 |
| 2,743,773 | Weiertz | May 1, 1956 |
| 2,748,856 | Tatter | June 5, 1956 |

FOREIGN PATENTS

| | | |
|---|---|---|
| 990,126 | France | June 6, 1951 |
| 859,117 | Germany | Dec. 11, 1952 |
| 180,556 | Great Britain | June 1, 1922 |